April 25, 1933.  W. D. BURTON  1,905,342
MECHANICAL STOKER
Filed Jan. 2, 1929
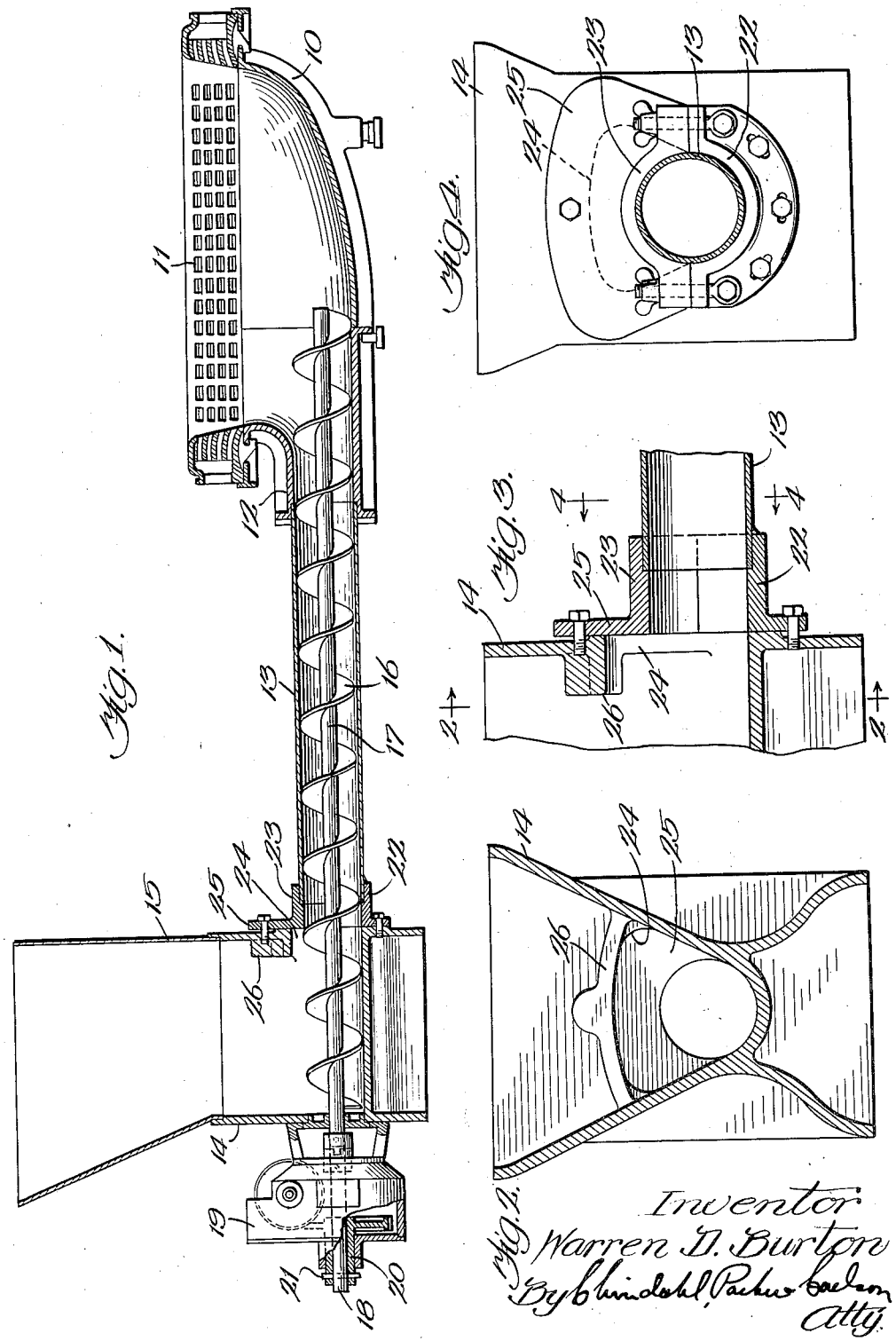

Patented Apr. 25, 1933

1,905,342

UNITED STATES PATENT OFFICE

WARREN DEAN BURTON, OF OAK PARK, ILLINOIS, ASSIGNOR TO COMBUSTIONEER, INC., OF CICERO, ILLINOIS, A CORPORATION OF ILLINOIS

MECHANICAL STOKER

Application filed January 2, 1929. Serial No. 329,793.

The present invention relates to improvements in mechanical stokers, and is particularly applicable to stokers of the underfeed type.

In one form of underfeed stokers, coal is fed by a power driven screw conveyor from a hopper through a conveyer casing or duct into the bottom of a retort where it is consumed. The coal supplied to the hopper often contains foreign objects, such as pieces of iron, steel or rock, which will not crush. Frequently, these objects form obstructions at the outlet of the hopper, thereby clogging the apparatus. In this event, if the drive for the screw conveyor is not disconnected, serious damage to the apparatus may result. To avoid the possibility of such damage, it is common to interpose a member in the drive for the screw conveyer which will shear or open to break the power connection when subjected to a force somewhat in excess of the force required in normal operation, and which can be readily replaced.

If an obstruction in the hopper causes a break down in the operation, obviously the obstruction must be removed before again starting up the operation. Heretofore, it has been necessary to empty the hopper to remove the obstruction, thereby involving considerable labor and inconvenience, and often keeping the stoker out of operation for a considerable period of time.

The primary object of the present invention therefore resides in the provision in an underfeed stoker of novel means for permitting obstructions in the hopper to be readily and quickly removed.

A more specific object resides in the provision of a removable closure in the side of the hopper adjacent the conveyer outlet for permitting obstructions to be readily and quickly removed without removing all of the coal from the hopper, and of means for deflecting coal from the hopper away from said closure.

Still another object resides in the provision in a stoker having a hopper, a discharge duct opening from the hopper, conveyer means for discharging fuel from the hopper into the duct, of an opening at the juncture of the hopper and the duct and a closure for the opening removable at will to afford access to the conveyer means, whereby any obstructions lodging between the conveyer means and the outlet from the hopper may be readily removed.

Further objects and advantages will become apparent as the description proceeds.

In the accompanying drawing, Figure 1 is a vertical, longitudinal sectional view of a stoker embodying the features of my invention.

Fig. 2 is a sectional view taken along line 2—2 of Fig. 3.

Fig. 3 is an enlarged fragmentary sectional view of the construction shown in Fig. 1.

Fig. 4 is a sectional view taken along line 4—4 of Fig. 3.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications falling within the spirit and scope of the invention as expressed in the appended claims.

Referring more specifically to the drawing, the exemplary embodiment of the invention comprises an upwardly opening retort 10 of standard construction having tuyere openings 11 about the upper edge and having an inlet duct 12 at the bottom. The inlet duct 12 is connected through a conveyor duct or casing 13 preferably cylindrical in form, to the base 14 of a hopper 15 into which coal is supplied. Extending through the base 14 and the casing 13 into the retort 10 for conveying coal from the hopper 15 into the bottom of the retort is a suitable conveyor screw 16 having a longitudinal shaft 17.

Any suitable means may be provided for driving the shaft 17, and to this end, the shaft extends out of the hopper base 14 for connection with the drive shaft 18 of an adjustable speed gearing 19 mounted on the base and adapted to be driven by any suitable power means (not shown). The gearing 19 comprises a drive sleeve 20 mounted on the shaft 18 and connected thereto by means of a shear pin 21. This shear pin is of such strength that it will withstand the torque of the conveyor screw 16 during normal operation, but will shear if an obstruction, such as a piece of iron, steel or stone, in the hopper base, binds or stops rotation of the conveyor screw, thereby automatically disconnecting the power drive.

The present invention resides primarily in the provision of novel means for facilitating the removal of obstructions in the base 14 tending to interfere with the operation of the conveyor screw, without necessitating the removal of all of the coal from the hopper 15. To this end, the hopper is formed with an opening giving access to the interior of the base 14 adjacent the outlet to the conveyor casing 13. In normal operation, this opening is sealed by a removable closure.

In the preferred form shown in the drawing, the casing 13 is secured to the hopper base 14 by means of a semi-cylindrical bracket 22 bolted to the base and welded to the underside of the casing, and an upper semi-cylindrical bracket 23 embracing the top of the casing and removably secured, as by means of bolts, to the adjacent wall of the hopper base and the bottom bracket 22. Formed in the wall of the hopper base 14 directly over the outlet to the casing 13 is a suitable opening 24 for permitting the removal of material. This opening normally is closed by an upstanding plate 25 formed integral with the upper bracket 23. In effect, the opening 24 constitutes the outlet opening of the base 14 and is enlarged at one side beyond the interior of the casing 13 so as to present an edge spaced from the screw 16. Preferably, the inlet end of the casing 13, and particularly that portion of the edge nearest to the spaced edge of the opening 24, is spaced from the base 14. Hence the effective space through which access may be had to the screw 16 at the point of shear with the bracket 23—25 is considerably larger that the space afforded by the opening 24.

Formed adjacent the upper margin of the opening 24 on the inside of the base wall is an inwardly extending deflector 26 preferably in the form of a flange. This deflector tends to prevent coal in the hopper from passing directly to the entrance of the conveyor casing 13.

In operation, if an obstruction binds or stops the conveyor screw 16, and thereby causes the pin 21 to shear, the upper bracket 23 with the plate 25 is quickly removed, and the obstruction is removed through the opening 24 by merely removing the material from the hopper base at the point at which the obstruction would take effect. Coal from the hopper is prevented from filling the space so created by the deflector flange 26. It will be evident that by reason of the foregoing construction, the obstruction can be readily and quickly removed without removing all of the coal from the hopper, and that the stoker therefore can be put into operation again without a considerable loss of time.

I claim as my invention:

1. A stoker comprising, in combination, a hopper having a discharge opening, a discharge duct in communication at one end with said opening, said opening being enlarged at one side to extend beyond the adjacent portion of said duct, a screw conveyer extending from said hopper through said opening into said duct, means opposite the enlarged portion of said opening for securing said duct to said hopper, a removable closure engaging said duct and closing said enlarged portion of said opening, and means for driving said conveyer, said means including a separable connection operable to open automatically upon the application of an excessive load to said conveyer.

2. A stoker comprising a vertical hopper having a hollow base, a cylindrical discharge duct opening laterally from said base, a conveyor screw in said hopper extending into said duct, means for driving said screw, said means including a shear connection, a semi-cylindrical bracket rigidly secured to the bottom of said duct and removably secured to said base, a semi-cylindrical bracket embracing the upper portion of said duct and removably secured to said first mentioned bracket and said base, said base having an opening underlying said second mentioned bracket and directly over said duct, and a marginal flange extending inwardly from said base above said opening.

3. A stoker comprising, in combination, a vertical hopper having a hollow base, a cylindrical discharge duct opening laterally from said base, a conveyor screw in said hopper extending into said duct, means for driving said screw, said means including a separable connection automatically operable to open upon the application of an excessive load to said screw, a semi-cylindrical bracket rigidly secured to said duct and removably secured to said base, and a semi-cylindrical bracket embracing said duct in opposed relation to said first mentioned bracket and removably secured to said first mentioned bracket and said base, said base having an opening underlying said last mentioned bracket.

4. A stoker comprising, in combination, a hopper having a discharge opening, a discharge duct in communication with said opening, a semi-cylindrical bracket embracing one side of the inlet end of said duct and having a peripheral end flange secured to said hopper about a portion of said opening, and a semi-cylindrical bracket embracing said duct in opposed relation to said first mentioned bracket removably secured to said first mentioned bracket and having a peripheral end flange removably secured to said hopper about the remaining portion of said opening, and means for feeding fuel from said hopper into said duct.

5. A stoker comprising, in combination, a hopper having a discharge opening, a discharge duct in communication with said opening, said opening being larger than said duct, and a plurality of abutting bracket members peripherally embracing the inlet end of said duct and removably secured together, said bracket members being removably secured to said hopper about said opening, one of said bracket members overlying a portion of said opening to close the latter, and means for conveying fuel from said hopper into said duct.

6. A stoker comprising, in combination, a hopper having a discharge opening, a discharge duct in communication with said opening, the inlet end of said duct being spaced from said opening, a plurality of segmental connecting members peripherally embracing the inlet end of said duct and secured to said hopper about said opening, one of said members being removable to afford access to said opening, and means for conveying fuel from said hopper into said duct.

7. A stoker comprising, in combination, a hopper having a discharge opening, a discharge duct secured at one side of one end to said hopper about a portion of said opening, a removable semi-cylindrical bracket member embracing the other side of said end of said duct and having a peripheral end flange secured in position against said hopper about the remaining portion of said opening, and means for feeding fuel from said hopper into said duct.

8. A stoker comprising, in combination, a hopper having a discharge opening, a discharge duct in communication with said opening, said opening being larger than said duct, a plurality of abutting bracket members peripherally embracing the inlet end of said duct, one of said bracket members being removably secured to said hopper about a portion of said opening, one of said bracket members being secured in position to close a portion of said opening, and means for conveying fuel from said hopper into said duct.

9. A stoker comprising, in combination, a hopper having a discharge opening, a discharge duct in communication with said opening, said opening extending beyond one side of said duct, a plurality of segmental connecting members peripherally embracing the inlet end of said duct and secured to said hopper about said opening, one of said members being removable to afford access to said opening, and screw conveyer means extending from said hopper through said opening into said duct for conveying fuel from said hopper into said duct.

10. A stoker comprising, in combination, a hopper having a discharge opening, a discharge duct in communication at one end with said opening, said opening being enlarged at one side to extend beyond the adjacent portion of said duct, a screw conveyer extending from said hopper through said opening into said duct, means opposite the enlarged portion of said opening for securing said duct to said hopper, and a removable closure engaging said duct and closing said enlarged portion of said opening.

11. A stoker comprising, in combination, a hopper having a discharge opening, a discharge duct in communication at one end with said opening, said opening being enlarged at one side to extend beyond the adjacent portion of said duct, means opposite the enlarged portion of said opening for securing said duct to said hopper, the portion of the inlet edge of said duct adjacent said enlarged portion of said opening being spaced from said hopper, and a removable closure embracing said edge of said duct and having a flange closing said enlarged portion of said opening.

12. A stoker comprising, in combination, a hopper having a base, said base having an upright wall formed with an outlet opening, a tubular discharge duct connected to said wall with its inlet end in communication with said opening, the lower portion of said opening being arcuate and in line with the inner surface of said duct, the upper portion of said opening being enlarged to extend laterally beyond the inner periphery of said duct, a removable closure secured in position against said wall across the enlarged portion of said opening to close the latter, and a screw conveyor extending from said base through said opening into said duct.

13. A stoker comprising, in combination, an upright hopper having a base, said base having an upright wall formed with an outlet opening, a discharge duct connected to said wall with its inlet end in communication with said opening, said inlet end being smaller internally than said opening and disposed eccentrically thereto so that a portion of said opening extends laterally beyond one side of the inner surface of said duct, a removable closure secured in position to close said portion of said opening outside of said duct, and a conveyer for discharging fuel from said hopper through said opening into said duct.

14. An underfeed stoker comprising, in combination, an upright fuel hopper having an outlet opening in one side, a generally horizontal discharge duct in communication at one end with said opening, a rotary screw conveyer extending from said hopper through said opening into said duct, the upper portion of said outlet opening having an edge substantially spaced vertically from the upper portion of said conveyer, the upper portion of the inlet end of said duct having an edge spaced from said base, said edges defining an opening at the juncture of said base and said duct affording access at will to said conveyer, and a removable bracket member secured in position to close said last-mentioned opening, said bracket member having means with an internal arcuate edge located in close shearing relation to the upper portion of said conveyer.

In testimony whereof, I have hereunto affixed my signature.

WARREN DEAN BURTON.